April 7, 1970  W. G. HUDSON  3,505,026
NOZZLE SYSTEM FOR FLUID DISPERSION
Filed Sept. 6, 1966  2 Sheets-Sheet 1
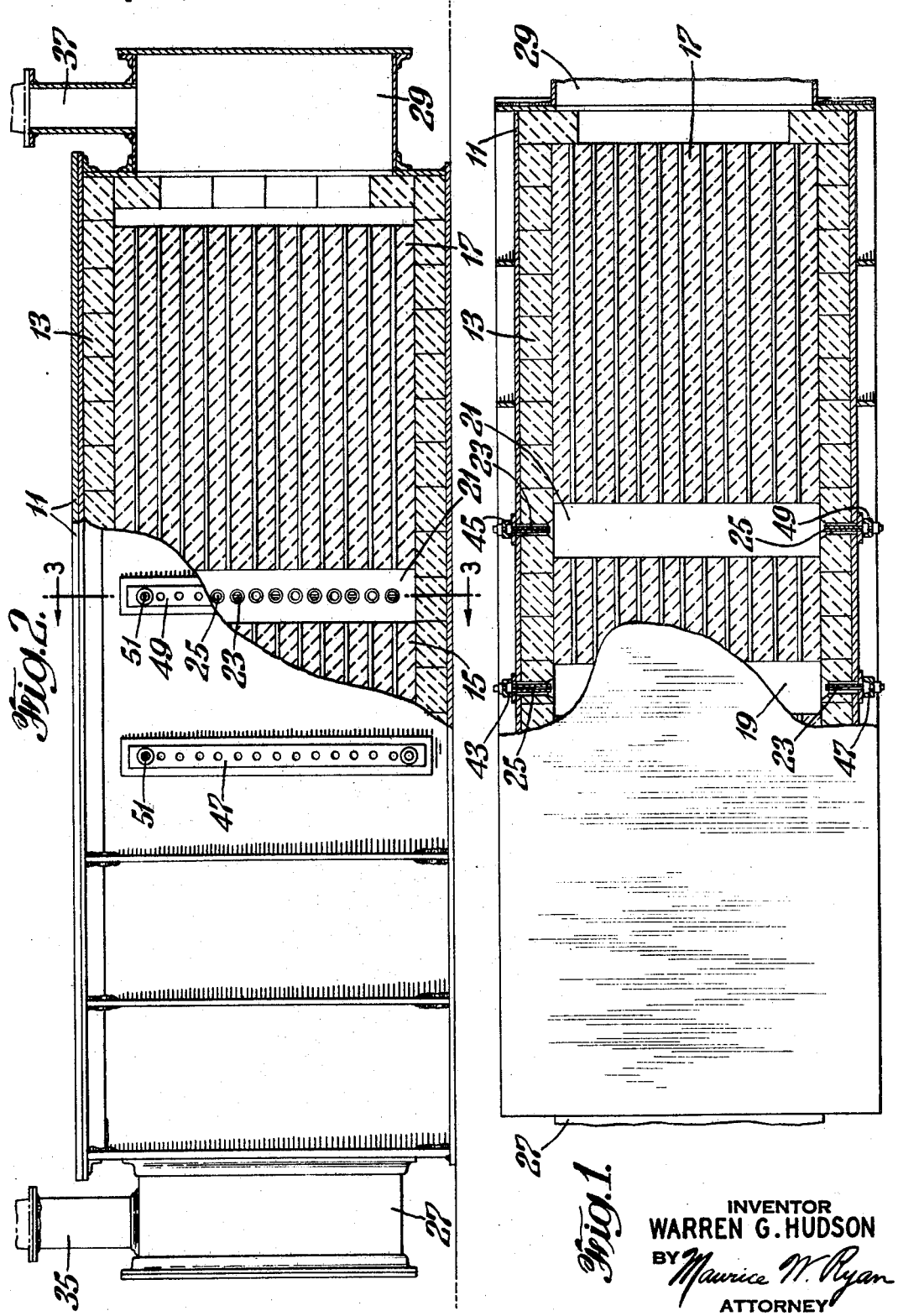
INVENTOR
WARREN G. HUDSON
BY Maurice W. Ryan
ATTORNEY April 7, 1970     W. G. HUDSON     3,505,026

NOZZLE SYSTEM FOR FLUID DISPERSION

Filed Sept. 6, 1966     2 Sheets-Sheet 2

INVENTOR
WARREN G. HUDSON
BY
ATTORNEY

United States Patent Office 3,505,026
Patented Apr. 7, 1970

3,505,026
NOZZLE SYSTEM FOR FLUID DISPERSION
Warren G. Hudson, South Charleston, W. Va., assignor to Union Carbide Corporation, a corporation of New York
Filed Sept. 6, 1966, Ser. No. 577,479
Int. Cl. C07c 11/24; F23c 5/28
U.S. Cl. 23—277                                              7 Claims

ABSTRACT OF THE DISCLOSURE

A nozzle system for spraying fluids into dispersion zones such as reactor vessels and the combustion chambers of fluid fuel-burning furnace apparatus. Nozzles of two different tip styles are used; one style being a drilled-through circular orifice and the other slotted. Arranged alternately in oppositely facing rows of disposed alternately peripherally around a dispersion zone, this nozzle arrangement effects even and uniform fluid dispersion in the zone.

---

This invention relates to a nozzle system for the controlled introduction of fluids into dispersion zones such as reactant fluids into reaction or mixing chambers in chemical process equipment or fluid fuels into combustion chambers of furnaces or the like for burning and, more particularly, to such a system comprising a multiplicity of nozzles of at least two different designs arranged and disposed with such a dispersion zone to provide for optimum uniform fluid dispersion within the zone.

While the present invention can be utilized to enhance the operation of any zone or chamber in which fluids are to be evenly dispersed, such as a reaction or mixing chamber in chemical process equipment or a fluid fuel burning furnace combustion chamber, it is particularly adaptable to and useful in the fluid fuel systems of regenerative apparatus such as those used to reform hydrocarbons for the production of gaseous fuels or to pyrolize hydrocarbon feedstock streams for the production of acetylenic and olefinic compounds as exemplified by the apparatus described in U.S. Patent No. 2,851,340 to Coberly et al., and it is with reference to such regenerative apparatus that the invention will be described hereinafter in detail.

In respect of reaction or mixing zones in chemical process equipment generally, there is the desideratum of operation that fluids to be reacted or mixed with other media therein be dispersed into the zone to produce as even and uniform as possible a fluid distribution. Spray or dispersion patterns of varying density and evenness across the zone can cause uneven reaction or mixing and tend to lower the operating efficiency of the process.

In respect of fluid fuel burning furnaces generally and in fluid fuel burning regenerative furnaces for hydrocarbon cracking and reforming particularly, there are the desiderata of operation that fuel combustion be carried out so as to attain the optimum possible heat release from the fuel used and that even heat distribution obtain in the combustion chambers and across faces of refractory masses being heated. (The terms "refractory" or "refractory mass" as used herein are deemed to include any heat retaining or heat transfer medium in a furnace apparatus such as tubes and other shapes from whatever material fabricated.) This requires and even dispersion pattern of the fuel in the combustion chamber and rapid mixing of fuel and preheated air to effect a complete as possible burning in the diffused flame. If there is uneven combustion and heat release due to uneven dispersion of fuel and/or inadequate mixing of the fuel and the combustion air, zones of varying temperature will occur. Thus, in pyrolysis furnaces, the cracking will be adversely affected, i.e., the hotter zones will overcrack the hydrocarbon feedstocks and the cooler zones will undercrack them, resulting in reduced yield of the desired product and the formation of unwanted carbon products. Also in such unbalanced operation, where extraordinarily hot zones are created, the refractory masses can be melted or otherwise adversely affected.

In known hydrocarbon pyrolysis furnace systems the apparatus comprises a gas-tight steel shell having a heat refractory lining and containing a refractory cracking mass, which may comprise tiles with holes extending therethrough or any other of numerous refractory checker constructions or assemblies known to persons familiar with the art. A combustion zone is provided in the furnace upstream of the cracking mass and a feedstock connection is made through a plenum upstream of the combustion zone. Combustion air supply conduits also connect to the plenum. Fuel is fed laterally (with respect to the flow of combustion air and feedstock streams) into the combustion zone through a multiplicity of nozzles at the same time that combustion air is fed through the furnace longitudinally. The fuel and air mix, burn, and heat the cracking mass for some predetermined period of time to bring the mass up to the desired cracking temperature. This part of the operation is known as the "heat step." At the completion of the heat step, the fuel and air flows are stopped and the feedstock stream is immediately directed through the furnace wherein it is cracked by pyrolysis while passing through the refractory cracking mass. This is known as the "make step." Products in the cracked gas which emerges through, for example, another plenum at the remote end of the furnace, may be subsequently separated and purified or used as otherwise desired. The foregoing general description applies also to reforming apparatus as well as to cracking apparatus but with the terms "reforming" and the like substituted for the terms "cracking" and the like and the product being a gaseous fuel, as persons familiar with the art will readily appreciate. In regenerative furnaces, such as described in U.S. Patent No. 2,882,900, the operation is the same as described above during any heat step or any make step but the furnace is provided with other refractory masses which operate alternately to quench the cracked or reformed product gases and to preheat the combustion air and/or feedstock streams.

The invention will be described with respect to a regenerative cracking furnace as shown in the drawings wherein:

FIGURE 1 is a plan view of a typical regenerative furnace with part of the top enclosure removed to show the interior;

FIGURE 2 is an elevational view, partly sectionalized, of the apparatus shown in FIGURE 1;

Figure 3:
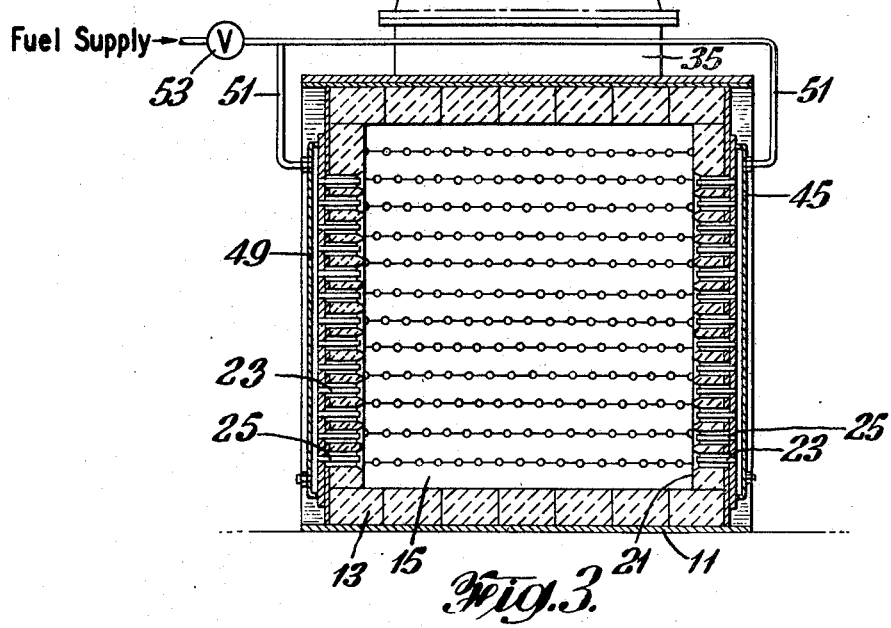
FIGURE 3 is a cross sectional view through the apparatus of FIGURE 1.

With reference to the drawings, a regenerative furnace is shown comprising a gas-tight steel shell 11 provided with a heat refractory lining 13. A feedstock refractory cracking mass 15 is shown centrally disposed in the furnace and an end (right) or outer refractory mass 17 is located between cracking mass 15 and the right end wall of the furnace. Another end mass similar to 17 is provided between the outer (left) end wall of the furnace and the cracking mass 15 but does not show fully in the drawings. Each of the three major operative refractory masses in the regenerative furnace has a multiplicity of longitudinally extending holes to permit flowthrough of the combustion air and the combustion gases during respective heat steps and the feedstock materials and the gases produced in cracking during the respective make steps. These main masses are disposed within the shell and its refractory liner to define two combustion zones 19 and 21 into which fuel is alternately intermittently injected during operation. Laterally of each combustion zone 19, 21, rows of fuel nozzles 23, 25 are arranged. Outboard the end walls of the furnace shell 11 plenums 27 and 29 are provided for alternate intake to the furnace of combustion air and feedstock streams and the alternate discharge from the furnace of combustion gases and cracked gas produced by the pyrolysis. The three-mass furnace shown in the drawings may be operated with a twin furnace of similar construction to provide a substantially constant output of product gases.

For the purpose of illustrating operation, a point at the beginning of a left-hand flowing heat step is chosen. During such left-hand flowing heat step (hereinafter designated LHH), combustion air enters plenum 29 through a conduit 37 and flows to the left through an opening in the right end wall of furnace shell 11, on through the holes extending longitudinally through refractory mass 17 into combustion chamber 21. In combustion chamber 21 the combustion air mixes with fuel injected under pressure through nozzle 23, 25 which burns to produce combustion gases which continue flowing leftward. The hot combustion gases pass first through refractory cracking mass 15 and heat it to a temperature sufficient to crack a selected feedstock, then pass through the holes in the left hand major mass of the furnace wherein they give up heat before exhausting through the left plenum 27 and a conduit 35.

Immediately upon attainment of the desired heat level in the central cracking mass 15, fuel and air to combustion chamber 21 are stopped and a right-hand flowing make step (hereinafter designated RHM) is initiated by directing feedstock at a high flow velocity from conduit 35, through plenum 27, the left hand mass of the furnace which preheats the feedstock stream and may also effect some cracking thereof), through the space defining combustion chamber 19 and into the cracking mass 15. Rapid cracking of most of the feedstock takes place during a relatively short residence time in the cracking mass 15. The cracked gas then passes through (now unfired) combustion chamber 21, end mass 17 wherein it is rapidly cooled, the opening in the right end wall of shell 11, plenum 29 and conduit 37 to be separated unto desired component products or otherwise usefully employed. In the next subsequent heat and make steps, the heat step will be right-hand flow (RHH) with combustion air furnished through conduit 35, plenum 27, the left end mass of the furnace, into combustion chamber 19 and the make step will be left-hand flow (LHM) with the feedstock stream furnished from conduit 37 through plenum 29 to flow in the LH direction.

When furnaces of the type described are operated in pairs the conduits 35, 37 connect to switch valves operated according to a preselected program to direct combustion gases and product cracked gases selectively to appropriate vents and product separation systems. Similarly, the combustion air and feedstock streams are switch valve controlled for the selectable introduction of these substances into the furnace by way of conduits 35, 37.

It should be noted that during any given heat step of a full cycle, combustion air cools the first mass it flows through and, after combustion, heats the other two, the cracking mass 15 being always heated to higher temperature than respective downstream end masses. It will be further appreciated by persons familiar with the art that during any make step of a full cycle, the feedstock stream will be preheated by taking on, from the end mass it initially contacts, some of the heat given to that end mass by the hot combustion gases of the immediately preceeding heat step.

The fuel supply for the nozzles 23, 25 at the combustion chambers 19, 21 may be provided by a fuel manifold arrangement as shown at 43, 45, 47, 49, with the manifolds supplied through suitable fuel supply conduits 51 furnished with the requisite valving devices 53 to start and stop fuel flow to the combustion chambers in accordance with the cyclic operation. As noted hereinabove, furnaces of this type may be operated in pairs with one of a pair always on a make step while the other is on a heat step. This provides for the continuous output of production gases and reduces pressure surges in the output lines and separation and purification equipment to which the products gases are directed.

It is essential during any heat step in a furnace of the type described that the maximum combustion efficiency, i.e., maximum heat release from the fuel, be obtained. For optimum cracking, the cracking mass 15 must receive heat in a substantially isothermal plane across its entire face as shown in FIGURE 3 of the drawings. When even heating throughout the combustion chamber obtains, together with as high as possible a heat release from the fuel, improved yield, increased capacity and higher overall operating efficiencies will be realized.

Prior to the time of the present invention, furnaces similar to the one described hereinabove had fuel nozzles of uniformly similar design. Depending upon the nozzle orifice design and pressure selected, various dispersion patterns can be obtained. In relatively small cross section furnaces a uniformly similar nozzle design may be selected which, in combination with a specific injection pressure, will produce a dispersion pattern to mix with the combustion air sufficiently to effect reasonably even burning. Losses in heat release as there will be in such circumstances are tolerated in view of relatively low total fuel consumption. With the ever increasing demand, however, for greater capacities per unit apparatus it has become necessary to design and construct furnaces of relatively large cross sectional areas. In such cases known fuel nozzle systems using uniform nozzle design have been found unsatisfactory. When a wide spray pattern nozzle design is used the spray trajectory will not reach into the middle zone of the combustion chamber and when a narrow long trajectory nozzle design is used there is uneven dispersion in the combustion chamber outer zones. When, in efforts to obtain more even combustion across refractory faces, relatively wide spray pattern nozzles are used with increased fuel pressure, an oversupply of fuel occurs and more unburned fuel is found in the flue gases.

With this then being the state of the art, the present invention was conceived and developed to provide a significant advance in the art.

In general, the present invention comprehends a novel arrangement of nozzles for the injection of fluid into a dispersion zone, said arrangement involving the use of at least two differently designed nozzle tips arrayed alternately in any given nozzle arrangement and further disposed so that each nozzle of one design is oppositely faced by a nozzle of a different design. The nozzle arrangement according to the present invention may be circular or peripheral around any shape dispersion zone or may take the form of rows along at least two opposite sides of any shape chamber. To suit particular requirements, more than a single row or periphery of nozzles may be used or the nozzles may be staggered in a row. Nozzle systems according to the present invention have been found to work very well with (but are not necessarily limited to) low pressure fuel supplies.

Figure 4:
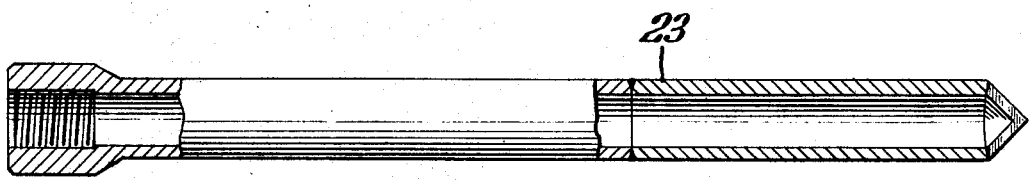
FIGURE 4 is a detailed section through one type nozzle according to the present invention.
Figure 5:
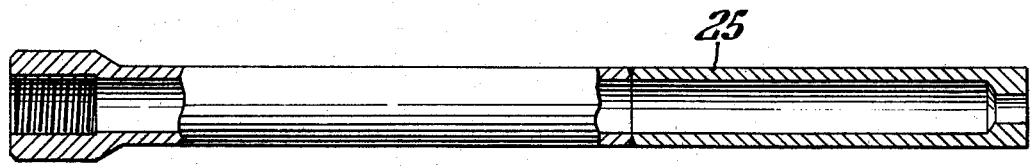
FIGURE 5 is a detailed section through another type nozzle according to the present invention.

In an embodiment of the invention illustrated in the drawings there are shown the nozzles 23, 25 each of different tip or orifice design, arranged alternately in rows at the sides of furnace combustion chambers. Opposite rows in each combustion chamber have nozzles of different design horizontally juxtaposed, that is to say, opposite each nozzle 23 is a nozzle 25. One of the nozzle tip designs comprehends a straight drilled-through circular orifice and the alternate design comprehends a slotted nozzle tip. FIGURE 4 of the drawings shows a cross sectional detail of a slotted tip nozzle 23 and FIGURE 5 of the drawings shows a cross sectional detail of a circular orifice tip nozzle 25.

In the embodiment shown the "23" nozzles effect a relatively wide fan shaped spray pattern and the circular orifice "25" nozzles effect effect a narrower but somewhat longer spray pattern. Thus it can be seen that the net resulting dispersion pattern of the fluid fuel is such that pattern deficiencies inherent in the use of only "23" nozzles are made up by the pattern contribution of the "25" nozzles and vice versa. The slotted nozzles mix the fuel with the combustion air near the walls of the combustion chamber and the circular orifice nozzles project the fuel further to mix with combustion air near the center of the chamber.

That the nozzle system of the present invention effects significant improvements in producing even and uniform fluid dispersion patterns is borne out by a number of tests conducted with regenerative furnace apparatus such as that described hereinbefore. The combustion chambers of the apparatus used were each 54 inches wide by 60 inches high by approximately 14 inches long. Preheated combustion air was mixed with a gaseous fuel injected transversely into the chambers by nozzles spaced on 4½ inch centers along each side, there being 13 nozzles in each row for a total of 26 per chamber. The "25" nozzles used were made from ¾ inch O.D., ½ inch I.D. high temperature resistant metal alloy with drilled-through circular nozzle tip orifices of 0.291 inch diameter. The "23" nozzles used were made from similar stock but with 45° angle conical tips slotted to a width of 0.105 inch.

EXAMPLE I

With a nozzle pattern:

```
23 →    ← 25
25 →    ← 23
23 →    ← 25
25 →    ← 23
23 →    ← 25
25 →    ← 23
23 →    ← 25
25 →    ← 23
23 →    ← 25
25 →    ← 23
23 →    ← 25
25 →    ← 23
23 →    ← 25
``` a gaseous fuel having the composition:

| | Percent |
|---|---|
| $O_2$ | 0.6 |
| $N_2$ | 2.3 |
| $CO$ | 1.3 |
| $H_2$ | 53.9 |
| $CH_4$ | 38.8 |
| $C_2H_2$ | 0.1 |
| $C_2H_4$ | 2.3 |
| $C_2H_6$ | 0.1 |
| $C_3H_6$ | 0.5 |
| $C_3H_8$ | 0.1 |
| | 100.0 | was injected into the combustion chamber at a nozzle pressure of 4.75 p.s.i.g. at a flow rate of 48M c.f.h. to mix and burn with combustion air furnished at a flow rate of 317M c.f.h.

An analysis of the flue gas yielded the following:

| | Percent |
|---|---|
| Excess air | 13.6 |
| Fuel unburned | 5.8 |
| Combustibles in flue gas | 1.6 |

Based upon this data the heat release was calculated to be 26.1MM B.t.u./hour.

EXAMPLE II

With a nozzle pattern the same as in Example I, a gaseous fuel having the composition:

| | Percent |
|---|---|
| $O_2$ | 0.2 |
| $N_2$ | 0.7 |
| $CO$ | 1.3 |
| $H_2$ | 54.6 |
| $CH_4$ | 40.1 |
| $C_2H_2$ | 0.1 |
| $C_2H_4$ | 2.3 |
| $C_2H_6$ | 0.1 |
| $C_3H_6$ | 0.5 |
| $C_3H_8$ | 0.1 |
| | 100.0 | was injected into the combustion chamber at a nozzle pressure of 6.0 p.s.i.g. at a flow rate of 53M c.f.h. to mix and burn with combustion air furnished at a flow rate of 325M c.f.h.

An analysis of the flue gas yielded the following:

| | Percent |
|---|---|
| Excess air | 8.3 |
| Fuel unburned | 5.0 |
| Combustibles in flue gas | 1.6 |

Based upon this data the heat release was calculated to be 28.3MM B.t.u./hour.

EXAMPLE III

For comparison purposes a test was run with a nozzle pattern:

```
25 →    ← 25
25 →    ← 25
25 →    ← 25
25 →    ← 25
25 →    ← 25
25 →    ← 25
25 →    ← 25
25 →    ← 25
25 →    ← 25
25 →    ← 25
25 →    ← 25
25 →    ← 25
25 →    ← 25
```

A gaseous fuel having essentially the same composition as that used in Example I was injected into the combustion chamber at a nozzle presure of 8 p.s.i.g. at a flow rate of 42M c.f.h. to mix and burn with combustion air furnished at a flow rate of 310M c.f.h.

An analysis of the flue gas yielded the following:

| | Percent |
|---|---|
| Excess air | 35.1 |
| Fuel unburned | 17.7 |
| Combustibles in flue gas | 4.6 |

Based upon this data the heat release was calculated to be 19.1MM B.t.u./hour.

EXAMPLE IV

In another comparison test using the same nozzle pattern as in Example III a gaseous fuel having essentially the same composition as that use in Example II was injected into the combustion chamber at a nozzle pressure of 24 p.s.i.g. at a flow rate of 45M c.f.h. to mix and burn with combustion air furnished at a flow rate of 270M c.f.h.

An analysis of the flue gas yielded the following:

| | Percent |
|---|---|
| Excess air | 7.4 |
| Fuel unburned | 28.3 |
| Combustibles in flue gas | 6.8 |

Based upon this data the heat release was calculated to be 19.6MM B.t.u./hour.

In the foregoing examples of the following definitions apply:

p.s.i.g.—pounds per square inch gauge

M c.f.h.—thousands of cubic feet per hour (Standard: i.e., volumes in cubic feet per hour are the actual metered flows referred to a gaseous basis at 14.7 pounds per square inch absolute and 70° F. temperature).

MM B.t.u./hour—millions of British thermal units per hour

All percentages given are percentages by volume. Combustion chamber pressure was maintained at approximately ½ atmosphere absolute for all tests of the examples.

A comparison of Examples I, II and III, IV shows significantly higher heat release and less unburned fuel in the flue gases when the nozzle system of the present invention is used, as compared with the use of nozzles of all the same configuration and it should be noted that this is accomplished in each instance with a lower fuel pressure.

In the slotted nozzles 23 used in the foregoing examples the nozzle conical tip had an angle of 45° measured from a plane transverse to the nozzle's longitudinal centerline. The spray pattern of fluid ejected through the slotted nozzles can be widened by increasing this angle and/or narrowed by decreasing this angle. Slotted nozzle conical tip angles of from about 40° to about 50° have been found to produce a very suitable range or selection of spray patterns in the practice of this invention but this range of conical tip angles is not necessarily limiting.

The foregoing description of the present invention is illustrative only and should not be construed in any limiting sense. In the light of this description alternative embodiments and modes of practicing the invention within the spirit thereof will doubtlessly occur to persons familar with the art. It is intended therefore to define the invention by the appended claims.

What is claimed is:

1. A nozzle system for injecting fluid into a fluid dispersion zone comprising, in combination, a multiplicity of nozzles, a first number of which has substantially similar conically shaped transversely slotted nozzle tips to produce a first fluid spray pattern and a second number of which has substantially similar circular orifice nozzle tips to produce a second fluid spray pattern, said multiplicity of nozzles being disposed in an arrangement with respect to said fluid dispersion zone such that one of said second number of nozzles occurs in said arrangement after each occurrence therein of one of said first number of nozzles and each of said second number of nozzles is in an appositive spraying relationship with one of said first number of nozzles, whereby said first fluid spray pattern is combined with said second fluid spray pattern to produce fluid dispersion within said fluid dispersion zone.

2. A nozzle system according to claim 1 wherein the conically shaped nozzle tip of each of said first number of nozzles has a conical angle measured from a plane transverse to the longitudinal centerline of the nozzle of from about 40° to about 50°.

3. A nozzle system according to claim 2 wherein said conical angle is about 45°.

4. A nozzle system according to claim 1 wherein said fluid dispersion zone is a combustion chamber in a fluid fuel burning furnace apparatus.

5. A nozzle system according to claim 4 wherein the conically shaped nozzle tip of each of said first number of nozzles has a conical angle measured from a plane transverse to the longitudinal centerline of the nozzle of from about 40° to about 50°.

6. A nozzle system according to claim 5 wherein said conical angle is about 45°.

7. A nozzle system according to claim 4 wherein the multiplicity of nozzles are arranged in two opposite facing rows along parallel sides of said combustion chamber.

References Cited

UNITED STATES PATENTS 3,202,196   8/1965   Rackley et al. _____ 122—6.5

J. H. TAYMAN, JR., Primary Examiner

U.S. Cl. X.R.

260—679; 23—284; 431—176, 174, 181, 175; 122—6.5; 110—28